United States Patent [19]

Yu

[11] Patent Number: 5,754,806
[45] Date of Patent: May 19, 1998

[54] MEMORY TABLE LOOK-UP DEVICE AND METHOD

[75] Inventor: Kuo Cheng Yu, Hsin Chu, Taiwan

[73] Assignee: Holtek Microelectronics, Inc., Hsin Chu, Taiwan

[21] Appl. No.: 552,217

[22] Filed: Nov. 3, 1995

[51] Int. Cl.⁶ ............................................. G06F 9/30
[52] U.S. Cl. ............................................. 395/376
[58] Field of Search ........................ 395/427, 481, 395/800, 376, 559

[56] References Cited

U.S. PATENT DOCUMENTS

| | | | |
|---|---|---|---|
| 5,561,819 | 10/1996 | Gephardt et al. | 395/847 |
| 5,561,821 | 10/1996 | Gephardt et al. | 395/848 |
| 5,623,634 | 4/1997 | Liu | 395/478 |

Primary Examiner—David Y. Eng
Attorney, Agent, or Firm—Knobbe, Martens, Olson & Bear, LLP

[57] ABSTRACT

A memory table look-up method for executing a table look-up instruction in an active program uses an instruction buffer executing device, a controller and a data register to output table look-up data from a memory to the data register. The method includes causing an instruction buffer executing device to execute a table look-up instruction obtained from the memory and pre-stored in the instruction buffer executing device in a first cycle to generate and output a table look-up signal, and to cause the controller to output a next instruction being an instruction next to the table look-up instruction in the active program from the memory to the instruction buffer executing device in response to the table look-up signal. The method further includes the step of causing the controller to generate a forbidding signal in a second cycle for latching the next instruction located in the instruction buffer executing device, and to generate and output a write-in instruction to the instruction buffer executing device for generating a write-in signal in order to output said table look-up data to the data register.

26 Claims, 7 Drawing Sheets

MEMORY TABLE LOOK-UP DEVICE AND METHOD

FIELD OF THE INVENTION

The present invention relates to a memory table look-up device and method, and more particularly to a memory table look-up device and method applied in a pipeline structure.

BACKGROUND OF THE INVENTION

In an execution of a micro-controller, those often used data (e.g., transformed values, information, and so forth) are stored in a read-only-memory (ROM) and then a transforming table will be established thereof. And an executing method therewith can be referred to FIG. 1 which schematically shows a table look-up configuration and procedure of a prior micro-controller 10. The prior micro-controller 10 includes a memory 11 (e.g., a ROM), a program counter 12, an index register 13, a multiplexer 14, a data register 15, a controller 16 and an instruction decoding and executing device 17, wherein the memory 11 includes an instruction data storage section 111 and a table look-up data storage section 112. The labels pc and m are respective internal values of the program counter 12 and the index register 13, and are respective addresses of the memory 11. Also, the label pc+1, adding 1 to the internal value pc of the program counter 12, indicates another internal value of the program counter 12 and another address pc+1 of the memory 11. And labels (pc), (pc+1) and (m) are memory internal values of the respective memory addresses pc, pc+1 and m. In the next delineation, the labels (pc) and (pc+1) respectively indicate a table look-up instruction and a next instruction stored in the instruction data storage section 111, and the label (m) indicates a table look-up data stored in the table look-up data storage section 112.

Hereinafter, a procedure of implementing a table look-up according to FIG. 1 will be depicted as follows:

Step 1: In response to a multiplexer controlling signal C1 generated by the controller 16 and being at a first multiplexer controlling state, a memory enable signal E and an internal value pc of the program counter 12, the memory 11 outputs the table look-up instruction (pc) from the instruction data storage section 111 to the instruction decoding and executing device 17, which is decoded by the same so as to output a table look-up signal L in order to start a table look-up procedure.

Step 2: In response to the table look-up signal L, the controller 16 outputs the multiplexer controlling signal C1 that is now under a second multiplexer controlling state to the multiplexer 14 so as to switch over and output the internal value m of the index register 13 to the table look-up data storage section 112.

Step 3: In response to the memory enable signal E, the memory 11 outputs the table look-up data (m); and in response to a write-in signal W generated by the controller 16, the data register 15 can store therein the table look-up data (m).

Step 4: When the table look-up signal L is not inputted to the controller 16, the controller 16 re-generates and outputs a multiplexer controlling signal C1 being at the first multiplexer controlling state to the multiplexer 14 so as to switch over and output the internal value pc+1 of the program counter 12 to the instruction data storage section 111 in order to serve the internal value pc+1 as an output address of the next instruction (pc+1) and then complete the table look-up procedure.

During the table look-up procedure, since a switch-over is required between the respective internal values of the program counter 12 and the index register 13 in order to read data in different address sections of the memory 11, relatively much time will be wasted in reading data once the micro-controller 10 is changed into a pipeline structure.

FIG. 2($a$) shows a pipeline structure of a micro-controller which includes a memory 21 (e.g., a ROM), a program counter 22, an instruction buffer 23, an instruction register 24 and an instruction decoding and executing device 25. And FIG. 2($b$) shows executing cycles of the pipeline-structured micro-controller which interposes a fetch cycle (FC) and an execution cycle (EC) to complete a pipeline operation, wherein the label n is an internal value of the program counter 22 served as a memory 21 address, the label (n) is an internal value (e.g., an instruction) of the memory 21 address n, and the labels $T_0$–$T_2$ are the respective $T_0$–$T_2$ cycles.

Referring to FIGS. 2($a$) and 2($b$), the detailed procedure of implementing a table look-up and the executing cycles thereof will be rendered as follows:

(1) In the $T_0$ cycle:

During the FC, the program counter 22 outputs the memory 21 address n so as to read the internal value, the instruction (n), to the instruction buffer 23.

(2) In the $T_1$ cycle:

i) During the EC, the instruction (n) is outputted from the instruction buffer 23 to the instruction register 24 so as to be decoded and executed by the instruction decoding and executing device 25.

ii) During the FC, the internal value n of the program counter 22 is added by 1 so as to output the memory 21 address n+1 from the program counter 22 in order to read the internal value, the instruction (n+1), to the instruction buffer 23.

(3) In the $T_2$ cycle:

i) During the EC, the instruction (n+1) is outputted from the instruction buffer 23 to the instruction register 24 so as to be decoded and executed by the instruction decoding and executing device 25.

ii) During the FC, the internal value n+1 of the program counter 22 is added by 1 so as to output the memory 21 address n+2 from the program counter 22 in order to read the internal value, the instruction (n+2), to the instruction buffer 23.

The entire procedure will not come to an end until all the instructions stored in the memory 21 are accomplished.

FIG. 3($a$) is a prior pipeline structured micro-controller having two layers, which includes a memory 31 (e.g., a ROM), a program counter 32, an index register 33, a multiplexer 34, a data register 35, a controller 36, an instruction buffer 37, an instruction register 38 and an instruction decoding and executing device 39. And the memory 31 includes an instruction data storage section 311 and a table look-up data storage section 312. The labels pc and m are respective internal values of the program counter 32 and the index register 33, and the labels pc and m are respective addresses of the memory 31, too. Also, the labels pc+1 and pc+2 resulted from respectively adding 1 and 2 to the internal value pc of the program counter 32 indicate other program counter 32 internal values and other memory 31 addresses pc+1 and pc+2. And labels (pc), (pc+1), (pc+2) and (m) are memory internal values of the respective memory addresses pc, pc+1, pc+2 and m. In the next delineation, the labels (pc) and (pc+1) respectively indicate a table look-up instruction and a next instruction stored in the instruction data storage section 311, and the label (m) indicates a table look-up data stored in the table look-up data storage section 312.

Hereinafter, a procedure of implementing a table look-up as shown in FIG. 3(a) and the executing cycles as shown in FIG. 3(b) will be explained as follows:

(1) In the $T_0$ cycle:

In response to a multiplexer controlling signal C1 generated by the controller 36 and being at a first multiplexer controlling state, a memory enable signal E and the internal value pc of the program counter 32, the memory 31 outputs the table look-up instruction (pc) from the instruction data storage section 311 to the instruction buffer 37.

(2) In the $T_1$ cycle:

i) During the EC, the table look-up instruction (pc) is outputted from the instruction buffer 37 to the instruction register 38, and the instruction decoding and executing device 39 reads from the instruction register 38 the table look-up instruction (pc) which will also be executed by the instruction decoding and executing device 39 so as to generate and output a table look-up signal L thereby.

ii) During the FC, in response to the multiplexer controlling signal C1 being at the first multiplexer controlling state, the memory enable signal E and the internal value pc+1 of the program counter 32, the memory 31 outputs the next instruction (pc+1) from the instruction data storage section 311 to the instruction buffer 37.

(3) In the $T_2$ cycle:

i) During the EC, no operation (NOP) is actuated.

ii) During the FC, in response to the table look-up signal L, the controller 36 generates and outputs the multiplexer controlling signal C1 being now at a second multiplexer controlling state to the multiplexer 34 so as to switch over and output the internal value m of the index register 33 to the memory 31; in response to the memory enable signal E, the memory 31 outputs the table look-up data from the table look-up data storage section 312 to the instruction buffer 37 so as to replace the next instruction (pc+1) which is previously stored in the instruction buffer 37 during the FC of the $T_1$ cycle.

(4) In the $T_3$ cycle:

i) During the EC, in response to a write-in signal W generated by the controller 36 and through the instruction register 38, the table look-up data (m) of the instruction buffer 37 is outputted to the data register 35 so as to accomplish the table look-up.

ii) During the FC, the controller 36 re-generates and outputs the multiplexer controlling signal C1 being at the first multiplexer controlling state to the multiplexer 34 so as to output the internal value pc+1 of the program counter 32 to the memory 31 in order to re-output the next instruction (pc+1) from the instruction data storage section 311 to the instruction buffer 37 in response to the memory enable signal E; wherein, the internal value of the program counter 32 still is pc+1 at this moment because the next instruction (pc+1) previously stored in the instruction buffer 37 during the FC of the $T_1$ cycle is replaced by the table look-up data (m) outputted to the instruction buffer 37 during the FC of the $T_2$ cycle.

(5) In the $T_4$ cycle:

i) During the EC, the next instruction (pc+1) in the instruction buffer 37 is outputted to the instruction register 38, which will be read and executed by the instruction decoding and executing device 39.

ii) During the FC, in response to the multiplexer controlling signal C1 being at the first multiplexer controlling state, the memory enable signal E and the internal value pc+2 of the program counter 32, the memory 31 outputs the next instruction (pc+2) from the instruction data storage section 311 to the instruction buffer 37. pos The entire procedure will not come to an end until all the instructions stored in the memory 31 are accomplished.

From the discussion above, a prior pipeline-structured micro-controller having two layers needs three cycles $T_1$~$T_3$ to implement the table look-up from the step of generating the table look-up signal L to the step of inputting the table look-up data (m) to the data register 35, wherein one of the three cycles will be wasted in pre-reading the next instruction (pc+1) and thus reduce the efficiency of the instruction buffer 37. Once the pipeline structure of the micro-controller 30 has more than three layers, the above time-wasting cycle will non-linearly raise and adversely lower down the efficiency of the micro-controller 30.

SUMMARY OF THE INVENTION

An object of the present invention is to provide a memory table look-up method capable of being used in a pipeline structure for reducing the time of executing the table look-up.

Another object of the present invention is to provide a memory table look-up device at a low cost without changing much configuration of the prior micro-controllers.

In accordance with the present invention, a memory table look-up method adapted to be used to execute a table look-up instruction in an active program by utilizing an instruction buffer executing device, a controller and a data register in order to output a table look-up data from a memory to the data register, which comprises steps of:

a) causing the instruction buffer executing device to execute the table look-up instruction obtained from the memory and pre-stored in the instruction buffer executing device in a first cycle for generating and outputting a table look-up signal, and causing the controller to output a next instruction being an instruction next to the table look-up instruction in the active program from the memory to the instruction buffer executing device in response to the table look-up signal; and b) causing the controller to generate a forbidding signal in a second cycle for latching the next instruction located in the instruction buffer executing device, and to generate and output a write-in instruction to the instruction buffer executing device for generating a write-in signal in order to output the table look-up data to the data register.

In accordance with a first aspect of the present invention, the memory includes an instruction data storage section and a table look-up data storage section.

In accordance with a second aspect of the present invention, in the step a), the instruction data storage section stores therein the table look-up instruction and the next instruction, and the table look-up data storage section stores therein the table look-up data.

In accordance with a third aspect of the present invention, the method further includes before the step a) a step of causing the controller to output the table look-up instruction of the instruction data storage section to the instruction buffer executing device in response to a program instruction counting value for an execution of the instruction buffer executing device.

In accordance with a fourth aspect of the present invention, the program instruction counting value is used in the instruction data storage section as an instruction address.

In accordance with a fifth aspect of the present invention, the method further includes after the step b) steps of:
- b1) utilizing the forbidding signal generated and outputted by the controller to latch the next instruction located in the instruction buffer executing device;
- b2) outputting the table look-up data from the memory to a data bus in response to a table look-up data index value;
- b3) causing the controller to generate and output the write-in instruction to the instruction buffer executing device so as to let the instruction buffer executing device execute the write-in instruction; and
- b4) causing the instruction buffer executing device to output the write-in signal to the data register so as to transmit the table look-up data located in the data bus to the data register.

In accordance with a sixth aspect of the present invention, in the step b2), the table look-up data index value is stored in an index register electrically connected to the memory.

In accordance with a seventh aspect of the present invention, the instruction buffer executing device includes an instruction buffer, an instruction register and an instruction decoding and executing device.

In accordance with an eighth aspect of the present invention, the instruction buffer latches therein the next table look-up instruction in response to the forbidding signal.

In accordance with a ninth aspect of the present invention, the instruction register stores therein the write-in instruction outputted from the controller.

In accordance a tenth aspect of the present invention, the instruction decoding and executing device sequentially decodes the table look-up instruction, the write-in instruction and the next instruction.

In accordance with an eleventh aspect of the present invention, the memory is a read only memory (ROM).

In accordance with the present invention, a memory table look-up device comprises a memory including a table look-up instruction, a next instruction and a table look-up data for sequentially outputting the table look-up instruction, the next instruction and the table look-up data in response to an index address controlling signal, an instruction buffer executing device electrically connected to the memory for being inputted the table look-up instruction and the next instruction from the memory, and generating and outputting a table look-up signal when executing the table look-up instruction, a controller electrically connected to the instruction buffer executing device and the memory for generating the index address controlling signal in response to the table look-up signal so as to let the memory output the table look-up data, generating a forbidding signal and a write-in instruction to the instruction buffer executive device so as to latch the next instruction inputted into the instruction buffer executing device, and meanwhile generating and outputting a write-in signal in response to the write-in instruction, and a data register electrically connected to the memory and the instruction buffer executing device for obtaining the table look-up data from the memory in response to the write-in signal.

In accordance with a twelfth aspect of the present invention, the memory is a read only memory (ROM).

In accordance with a thirteenth aspect of the present invention, the instruction buffer executing further includes an instruction buffer electrically connected to the memory and the controller for sequentially inputting the table look-up instruction and the next instruction from the memory, and latching the next table look-up instruction when inputted thereinto in response to the forbidding signal, and an instruction execution device electrically connected to the instruction buffer, the controller and the data register for generating the table look-up signal to the controller when executing the table look-up instruction and executing the write-in instruction so as to generate and output the write-in signal to the data register.

In accordance with a fourteenth aspect of the present invention, the instruction execution device includes an instruction register electrically connected to the instruction buffer and the controller for sequentially storing the table look-up instruction and the next instruction and inputting from the controller the write-in instruction, and an instruction decoding executing device electrically connected to the instruction register and the controller for executing the table look-up instruction and the write-in instruction inputted from the instruction register so as to respectively generate the table look-up signal and the write-in signal which are in turn inputted to the controller.

In accordance with a fifteenth aspect of the present invention, the memory table look-up device further includes a program counter for storing a storage address in the memory for the table look-up instruction and the next instruction, an index register for storing storage address in the memory for the table look-up data, and a multiplexer electrically connected to the program counter, the index register, the controller and said memory, in response to a multiplexer controlling signal outputted from the controller, for alternately using internal values of the program counter and the index register as the index address controlling signal in order to alternately output the table look-up instruction, the next instruction and the table look-up data to the memory.

In accordance with a sixteenth aspect of the present invention, the controller outputs the multiplexer controlling signal at a first multiplexer controlling state when the table look-up signal is not inputted therein so as let the internal value of the program counter be used as the index address controlling signal in order to make the memory output one of the table look-up instruction and the next instruction, and when the table look-up signal is inputted to the controller, the multiplexer controlling signal is at a second multiplexer controlling state and the internal value of the index register is used as the index address controlling signal in order to make the memory output said table look-up data.

In accordance with a seventeenth aspect of the present invention, the first and second multiplexer controlling states are respectively a relative high electrical potential state and a relative low electrical potential state.

In accordance with an eighteenth aspect of the present invention, the first and second multiplexer controlling states are respectively a relative low electrical potential state and a relative high electrical potential state.

In accordance with a nineteenth aspect of the present invention, the memory table look-up device further includes a de-multiplexer electrically connected to the memory, the instruction buffer executive device, the data register and the controller for alternatively outputting the table look-up instruction and the next instruction to the instruction buffer executing device and sending the table look-up data to the data register in response to a de-multiplexer controlling signal outputted from the controller.

In accordance with a twentieth aspect of the present invention, the controller outputs the de-multiplexer controlling signal at a first de-multiplexer controlling state when the table look-up signal is not inputted therein so as to output the table look-up instruction and the next instruction to the instruction buffer executing device, and when the table look-up data is inputted into the controller, the de-multiplexer controlling signal is at a second de-multiplexer controlling state and the table look-up data is to be outputted to the data register.

In accordance with a twenty-first aspect of the present invention, the first and second de-multiplexer controlling states are respectively a relative high electrical potential state and a relative low electrical potential state.

In accordance with a twenty-second aspect of the present invention, the first and second de-multiplexer controlling states are respectively a relative low electrical potential state and a relative high electrical potential state.

In accordance with a twenty-third aspect of the present invention, the memory includes an instruction data storage section and a table look-up storage section.

In accordance with a twenty-fourth aspect of the present invention, the instruction data storage section stores therein the table look-up instruction and the next instruction, and the table look-up data storage section stores therein the table look-up data.

The present invention may best be understood through the following description with reference to the accompanying drawings, in which:

DETAILED DESCRIPTION OF THE PREFERRED EMBODIMENT

Figure 4A:
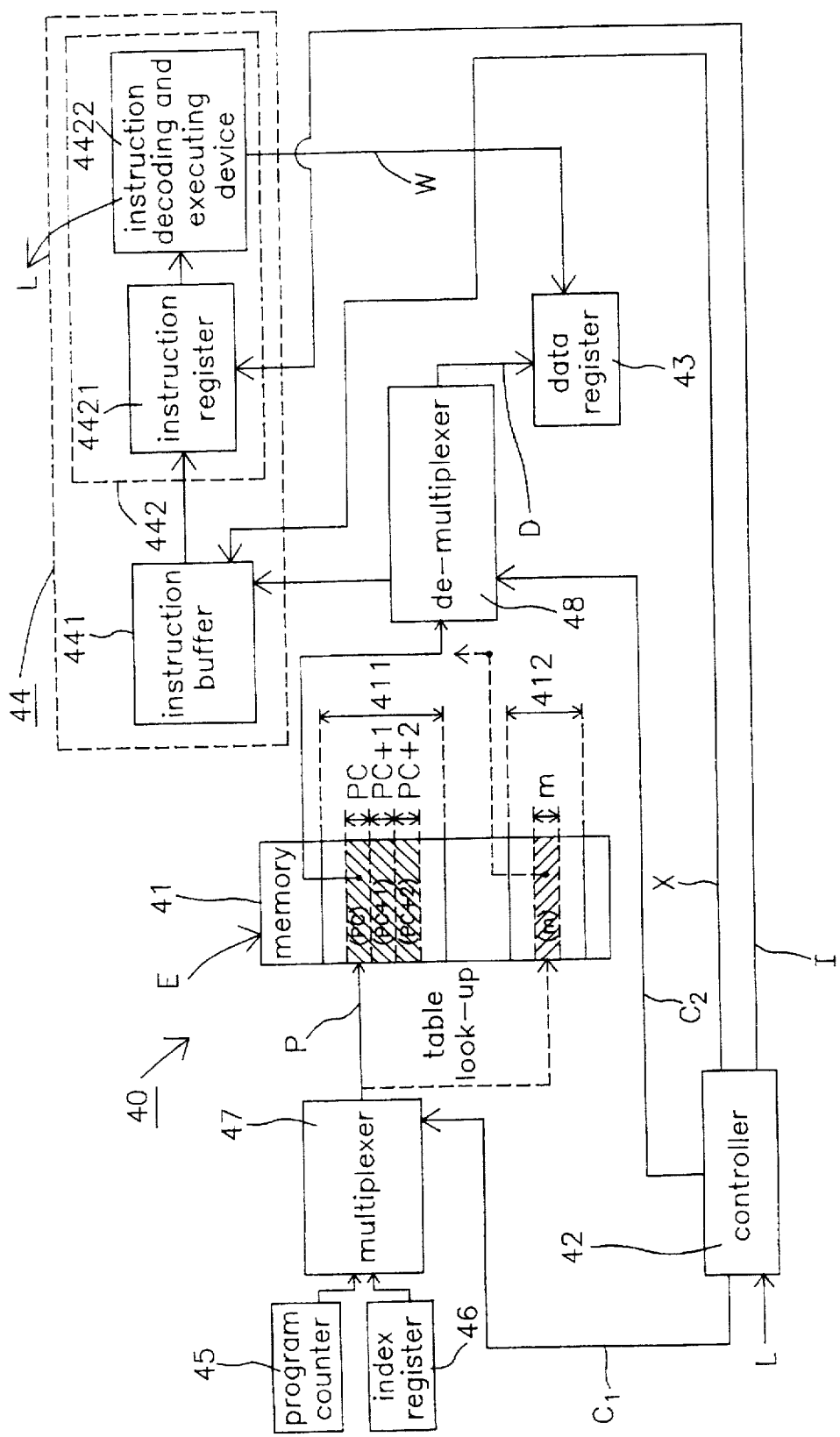
FIGS. 4(a) and 4(b) are schematic views respectively showing a preferred embodiment of a micro-controller structure and a cyclical implementation thereof according to the present invention.

Referring to FIG. 4(a), a preferred embodiment of a micro-controller 40 according to the present invention includes a memory 41 (e.g., a ROM), a controller 42, a data register 43, an instruction buffer executing device 44, a program counter 45, an index register 46, a multiplexer 47 and a de-multiplexer 48. And the instruction buffer executing device 44 includes an instruction buffer 441 and an instruction executing device 442 which further includes an instruction register 4421 and an instruction decoding and executing device 4422. Also, the memory 41 includes an instruction data storage section 411 and a table look-up data storage section 412. The labels pc and m are respective internal values of the program counter 45 and the index register 46 and are the respective memory 41 addresses pc and m. Further, the labels pc+1 and pc+2 resulted from respectively adding 1 and 2 to the internal value pc of the program counter 45, indicate other internal values of the program counter 45 and other memory 41 addresses pc+1 and pc+2. And labels (pc), (pc+1), (pc+2) and (m) are memory internal values of the respective memory addresses pc, pc+1, pc+2 and m. In the present invention, the labels (pc) and (pc+1) respectively indicate a table look-up instruction and a next instruction stored in the instruction data storage section 411, and the label (m) indicates a table look-up data stored in the table look-up data storage section 412.

Figure 4B:
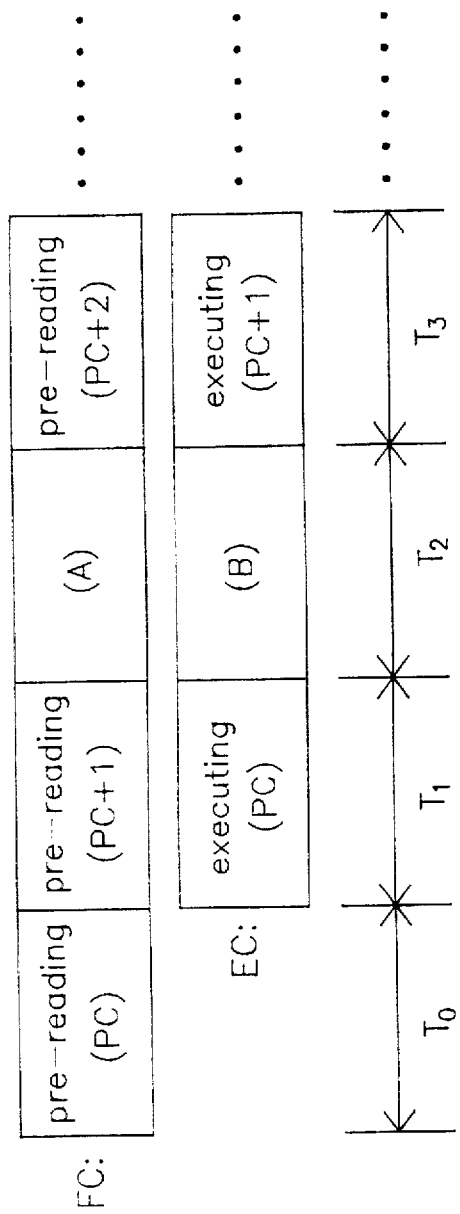

Hereinafter, a preferred embodiment of a table look-up implementing procedure as shown in FIG. 4(a) and a table look-up executing cycles according to the present micro-controller 40 as shown in FIG. 4(b) will be explained as follows:

(1) In the $T_0$ cycle:

In response to a multiplexer controlling signal C1 being at a first multiplexer controlling state and a de-multiplexer controlling signal C2 being at a first de-multiplexer controlling state both generated by the controller 42, a memory enable signal E and the internal value pc of the program counter 45 functioned as an index address controlling signal P, the memory 41 outputs the table look-up instruction (pc) from the instruction data storage section 411 to the instruction buffer 441.

(2) In the $T_1$ cycle:

i) During the EC, the table look-up instruction (pc) is outputted from the instruction buffer 441 to the instruction register 4421, and the instruction decoding and executing device 4422 reads from the instruction register 4421 the table look-up instruction (pc) which will also be executed by the instruction decoding and executing device 4422 so as to generate and output a table look-up signal L thereby.

ii) During the FC, in response to the multiplexer controlling signal C1 being at the first multiplexer controlling state and a de-multiplexer controlling signal C2 being at the first multiplexer controlling state, the memory enable signal E and the internal value pc+1 of the program counter 45, the memory 41 outputs the next instruction (pc+1) from the instruction data storage section 411 to the instruction buffer 441.

(3) In the $T_2$ cycle:

i) During the EC, the controller 42 generates a forbidding signal X to the instruction buffer 441 so as to latch the next instruction pc+1), and the controller 42 generates a write-in instruction I to the instruction register 4421 so that the instruction decoding and executing device 4422 reads the write-in instruction I from the instruction register 4421 and executes the write-in instruction I so as to generate and output a write-in signal W to the data register 43 in order to cause the data register 43 to receive data of a data bus D (wherein the data are the table look-up data (m) which will be sent to the data bus D during the FC of the $T_2$ cycle) as can be referred to the portion labeled (B) in FIG. 4(b).

ii) During the FC, in response to the table look-up signal L, the controller 42 generates the multiplexer controlling signal C1 being at a second multiplexer controlling state to the multiplexer 47 and generates the de-multiplexer controlling signal C2 being at a second de-multiplexer controlling state to the de-multiplexer 48 so as to switch over and output the internal value m of the index register 46, which functions as the index address controlling signal P; and in response to the memory enable signal E, the memory 41 outputs the table look-up data (m) stored in the table look-up data storage section 412 to the data bus D as can be referred to the portion labeled (A) in FIG. 4(a).

(4) In the $T_3$ cycle:

i) During the EC, the latched next instruction (pc+1) is outputted to the instruction register 4421, which will be read and executed by the instruction decoding and executing device 4422.

ii) During the FC, the controller 42 re-generates and outputs the multiplexer controlling signal C1 being at the first multiplexer controlling state to the multiplexer 47 and re-generates and outputs the de-multiplexer controlling signal C2 being at the first de-multiplexer controlling state to the de-multiplexer 48. And the internal value pc+2 of the program counter 45 resulted from adding 1 to the internal value pc+1 of the program counter 45 is outputted to the memory 41 so that the memory 41 outputs the instruction pc+2) from the instruction data storage section 411 to the instruction buffer 441 in response to the memory 41 enable signal E. The entire procedure will not come to an end until all the instructions stored in the memory 41 are accomplished.

Figure 1:
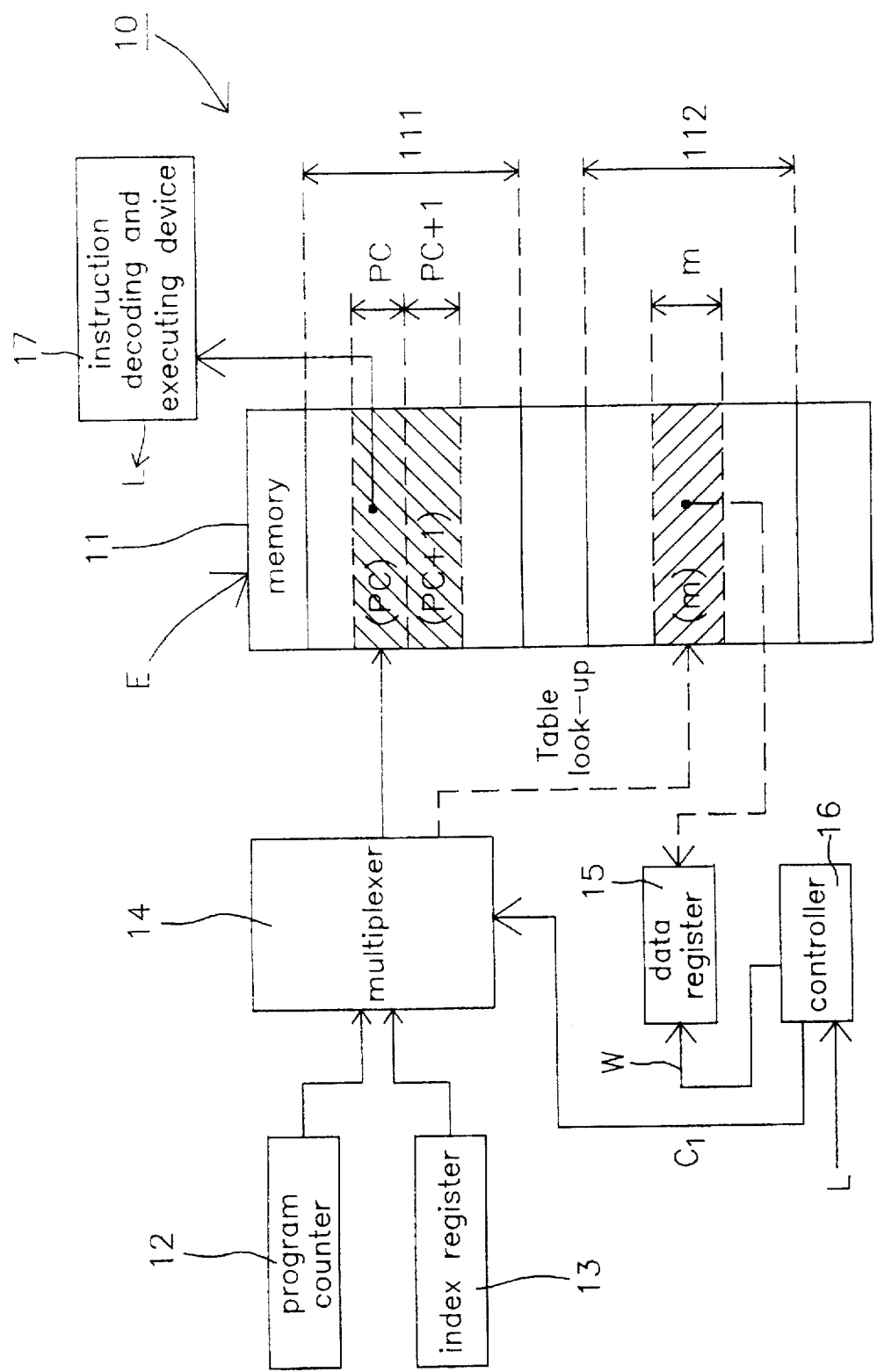
FIG. 1 is a schematic view showing a table look-up structure and a table look-up implementing procedure of a prior micro-controller.
Figure 2A:
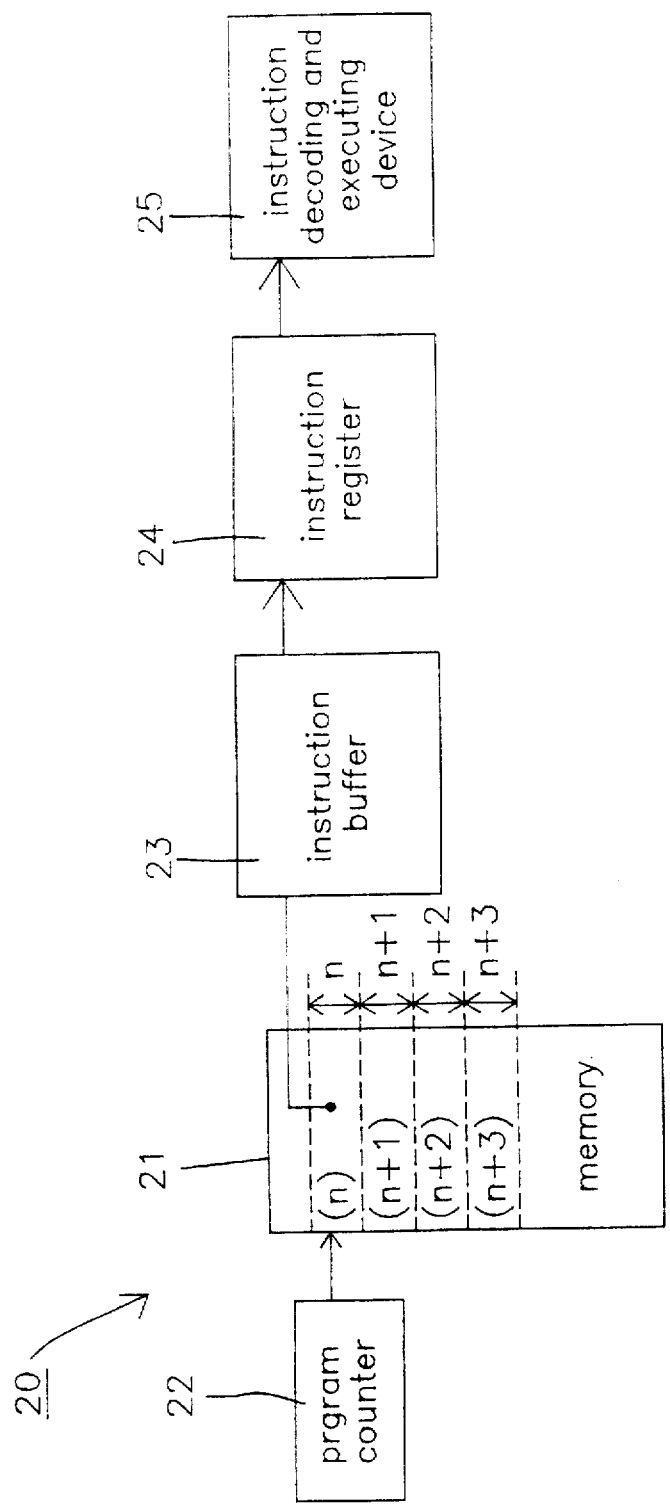
FIGS. 2(a) and 2(b) are schematic views respectively showing a pipeline structure of a second prior micro-controller and a cyclical implementation thereof.
Figure 2B:
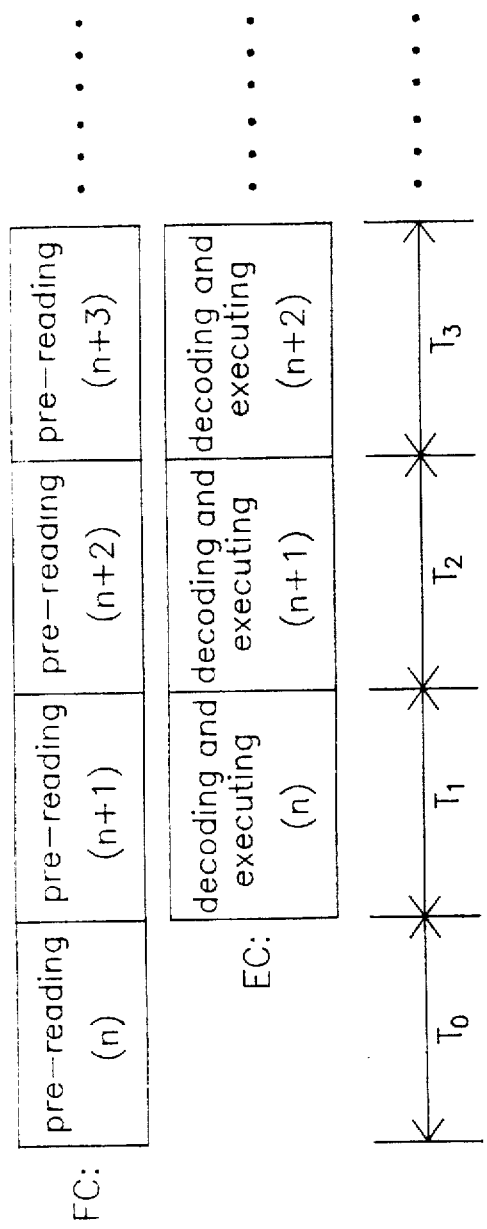
Figure 3A:
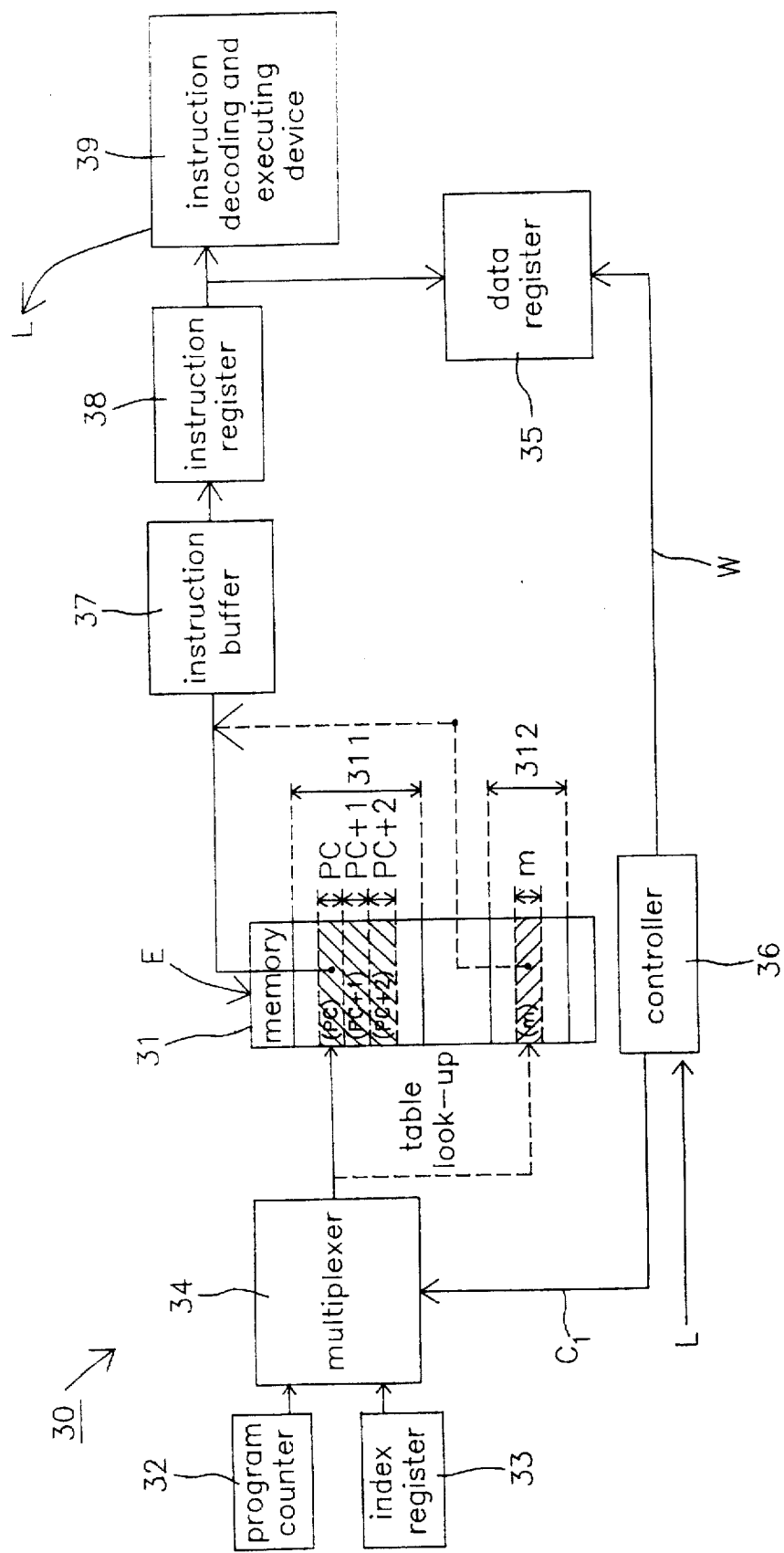
FIGS. 3(a) and 3(b) are schematic views respectively showing a pipeline structure of a third prior micro-controller and a cyclical implementation thereof.
Figure 3B:
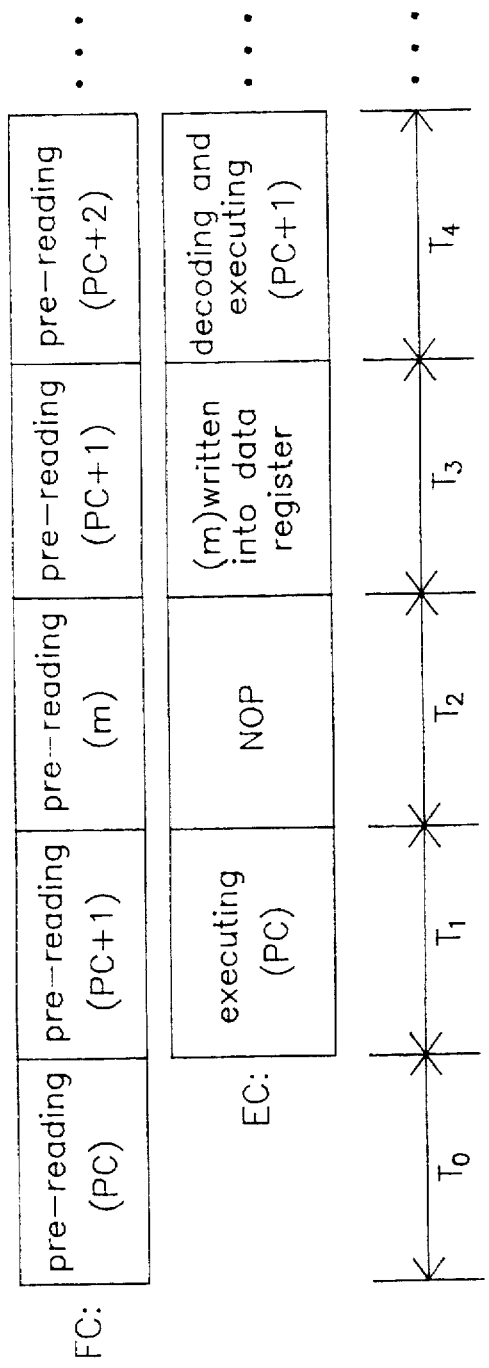

According to the above discussion, the present micro-controller 40 having two-layered pipeline structure will require only two cycles ($T_1$ and $T_2$) from generating the table look-up signal L to inputting the table look-up data (m) to the data register 43. Besides, once the pipeline structure of the present micro-controller 40 has more than two layers, the required cycles for executing the table look-up will be much less than that of a prior one as shown in FIGS. 3(a) and 3(b) so as to greatly enhance the performance efficiency of the micro-controller 40.

Preferably, the present invention may output the address m of the table look-up data (m) stored in the memory 41, and the internal values pc, pc+1, pc+2 of the program counter 45, and so on may function as the index address controlling signal P so that the index register 46 and the multiplexer 47 can be spared from the present micro-controller 40.

Also, the present invention may output the index address controlling signal P by the controller 42 so as to further spare the program counter 45 from the present micro-controller 40. In addition, the output end of the present instruction data storage section 411 can be electrically connected to the instruction buffer 441 and the output end of the present table look-up data storage section 412 can be electrically connected to the data register 43 so as to again omit the de-multiplexer 48.

In another aspect of the present invention, if the number of bits of the memory 41 internal value is larger than that of the data bus D, then another set of data register can be added in order to store the supernumerary bits.

As a conclusion, the present invention provides a memory table look-up method and device having practical advantages of low cost, good compatibility with a pipeline structure and time-saving when executing the table look-up.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A memory table look-up method adapted to be used to execute a table look-up instruction in an active program by utilizing an instruction buffer executing device, a controller and a data register in order to output a table look-up data from a memory to said data register, which comprises steps of:
   a) causing said instruction buffer executing device to execute said table look-up instruction obtained from said memory and pre-stored in said instruction buffer executing device in a first cycle for generating and outputting a table look-up signal, and causing said controller to output a next instruction being an instruction next to said table look-up instruction in said active program from said memory to said instruction buffer executing device in response to said table look-up signal; and
   b) causing said controller to generate a forbidding signal in a second cycle for latching said next instruction located in said instruction buffer executing device, and to generate and output a write-in instruction to said instruction buffer executing device for generating a write-in signal in order to output said table look-up data to said data register.

2. A method according to claim 1, wherein said memory includes an instruction data storage section and a table look-up data storage section.

3. A method according to claim 2, wherein, in said step a), said instruction data storage section stores therein said table look-up instruction and said next instruction, and said table look-up data storage section stores therein said table look-up data.

4. A method according to claim 3 further including before said step a) a step of causing said controller to output said table look-up instruction of said instruction data storage section to said instruction buffer executing device in response to a program instruction counting value for an execution of said instruction buffer executing device.

5. A method according to claim 4, wherein said program instruction counting value is used in said instruction data storage section as an instruction address.

6. A method according to claim 1 further including after said step b) steps of:
   b1) utilizing said forbidding signal generated and outputted by said controller to latch said next instruction located in said instruction buffer executing device;
   b2) outputting said table look-up data from said memory to a data bus in response to a table look-up data index value;
   b3) causing said controller to generate and output said write-in instruction to said instruction buffer executing device so as to let said instruction buffer executing device execute said write-in instruction; and
   b4) causing said instruction buffer executing device to output said write-in signal to said data register so as to transmit said table look-up data located in said data bus to said data register.

7. A method according to claim 6, wherein, in said step b2), said table look-up data index value is stored in an index register electrically connected to said memory.

8. A method according to claim 1, wherein said instruction buffer executing device includes an instruction buffer, an instruction register and an instruction decoding and executing device.

9. A method according to claim 8, wherein said instruction buffer latches therein said next table look-up instruction in response to said forbidding signal.

10. A method according to claim 8, wherein said instruction register stores therein said write-in instruction outputted from said controller.

11. A method according to claim 8, wherein said instruction decoding and executing device sequentially decodes said table look-up instruction, said write-in instruction and said next instruction.

12. A method according to claim 1, wherein said memory is a read only memory (ROM).

13. A memory table look-up device comprising:
    a memory including a table look-up instruction, a next instruction and a table look-up data for sequentially outputting said table look-up instruction, said next instruction and said table look-up data in response to an index address controlling signal;

an instruction buffer, executing device electrically connected to said memory for being inputted said table look-up instruction and said next instruction from said memory, and generating and outputting a table look-up signal when executing said table look-up instruction;

a controller electrically connected to said instruction buffer-executing device and said memory for generating said index address controlling signal in response to said table look-up signal so as to let said memory output said table look-up data, generating a forbidding signal and a write-in instruction to said instruction buffer executing device so as to latch said next instruction inputted into said instruction buffer executing device, and meanwhile generating and outputting a write-in signal in response to said write-in instruction; and a data register electrically connected to said memory and said instruction buffer executing device for obtaining said table look-up data from said memory in response to said write-in signal.

14. A memory table look-up device according to claim 13, wherein said memory is a read only memory (ROM).

15. A memory table look-up device according to claim 13, wherein said instruction buffer executing device further includes:

an instruction buffer electrically connected to said memory and said controller for sequentially inputting said table look-up instruction and said next instruction from said memory, and latching said next table look-up instruction when inputted thereinto in response to said forbidding signal; and an instruction execution device electrically connected to said instruction buffer, said controller and said data register for generating said table look-up signal to said controller when executing said table look-up instruction and executing said write-in instruction so as to generate and output said write-in signal to said data register.

16. A memory table look-up device according to claim 15, wherein said instruction execution device includes:

an instruction register electrically connected to said instruction buffer and said controller for sequentially storing said table look-up instruction and said next instruction and inputting from said controller said write-in instruction; and an instruction decoding and executing device electrically connected to said instruction register and said controllers for executing said table look-up instruction and said write-in instruction inputted from said instruction register so as to respectively generate said table look-up signal which is fed to said controller, and said write-in signal which is sent to said data register.

17. A memory table look-up device according to claim 13 further including:

a program counter for storing a storage address in said memory for said table look-up instruction and said next instruction;

an index register for storing storage address in said memory for said table look-up data; and a multiplexer electrically connected to said program counter, said index register, said controller and said memory, in response to a multiplexer controlling signal outputted from said controller, for alternately using internal values of said program counter and said index register as said index address controlling signal in order to alternately output said table look-up instruction, said next instruction and said table look-up data to said memory.

18. A memory table look-up device according to claim 17, wherein said controller outputs said multiplexer controlling signal at a first multiplexer controlling state when said table look-up signal is not inputted therein so as to let said internal value of said program counter be used as said index address controlling signal in order to make said memory output one of said table look-up instruction and said next instruction, and when said table look-up signal is inputted to said controller, said multiplexer controlling signal is at a second multiplexer controlling state and said internal value of said index register is used as said index address controlling signal in order to make said memory output said table look-up data.

19. A memory table look-up device according to claim 18, wherein said first and second multiplexer controlling states are respectively a relative high electrical potential state and a relative low electrical potential state.

20. A memory table look-up device according to claim 18, wherein said first and second multiplexer controlling states are respectively a relative low electrical potential state and a relative high electrical potential state.

21. A memory table look-up device according to claim 13 further including a de-multiplexer electrically connected to said memory, said instruction buffer executing device, said data register and said controller for alternatively outputting said table look-up instruction and said next instruction to said instruction buffer executing device and sending said table look-up data to said data register in response to a de-multiplexer controlling signal outputted from said controller.

22. A memory table look-up device according to claim 21, wherein said controller outputs said de-multiplexer controlling signal at a first de-multiplexer controlling state when said table look-up signal is not inputted therein so as to output said table look-up instruction and said next instruction to said instruction buffer executing device, and when said table look-up data is inputted into said controller, said de-multiplexer controlling signal is at a second de-multiplexer controlling state and said table look-up data is to be outputted to said data register.

23. A memory table look-up device according to claim 22, wherein said first and second de-multiplexer controlling states are respectively a relative high electrical potential state and a relative low electrical potential state.

24. A memory table look-up device according to claim 22, wherein said first and second de-multiplexer controlling states are respectively a relative low electrical potential state and a relative high electrical potential state.

25. A memory table look-up device according to claim 13, wherein said memory includes an instruction data storage section and a table look-up storage section.

26. A memory table look-up device according to claim 25, wherein said instruction data storage section stores therein said table look-up data instruction and said next instruction, and said table look-up data storage section stores therein said table look-up data.

* * * * *